United States Patent [19]
Bazshushtari et al.

[11] Patent Number: 5,869,411
[45] Date of Patent: Feb. 9, 1999

[54] CARBON FIBER REINFORCED CARBON/ CARBON COMPOSITE AND METHOD OF ITS MANUFACTURE

[75] Inventors: Afshin Bazshushtari, Rancgi Oakis Verdes, Calif.; Edward Lee Morris, Jr., Pueblo, Colo.

[73] Assignee: The B. F. Goodrich Company, Richfield, Ohio

[21] Appl. No.: 223,942

[22] Filed: Apr. 6, 1994

Related U.S. Application Data

[63] Continuation of Ser. No. 754,774, Sep. 4, 1991, abandoned.
[51] Int. Cl.⁶ .............................. D04H 1/46; D04H 18/00
[52] U.S. Cl. ...................... 442/340; 442/327; 442/332; 442/334; 442/340; 442/346; 442/349; 442/366; 442/381; 442/387; 442/388; 428/408
[58] Field of Search .............................. 428/408; 442/327, 442/332, 334, 340, 349, 346, 366, 381, 387, 388

[56] References Cited

U.S. PATENT DOCUMENTS

| | | | |
|---|---|---|---|
| 3,156,016 | 11/1964 | Dunlap | 19/66 |
| 3,657,061 | 4/1972 | Carlson et al. | 161/81 |
| 3,730,824 | 5/1973 | Watson | 161/142 |
| 4,339,021 | 7/1982 | Kosuda et al. | 191/50 |
| 4,780,363 | 10/1988 | Evans | 428/300 |
| 4,790,052 | 12/1988 | Olry | 28/110 |
| 4,876,128 | 10/1989 | Zafiroglu | 428/102 |

FOREIGN PATENT DOCUMENTS

| | | | |
|---|---|---|---|
| 0232059A2 | 12/1987 | European Pat. Off. | |
| 0386633 | 3/1990 | European Pat. Off. | D04H 1/10 |
| 2626294A1 | 1/1988 | France | D04H 1/46 |
| 2626294 | 2/1988 | France | D04H 1/46 |
| 3137844A1 | 9/1981 | Germany | D01G 11/00 |
| 1447030 | 7/1972 | United Kingdom | D04H 3/04 |
| 2012671 | 6/1982 | United Kingdom | |
| 2230491A | 10/1990 | United Kingdom | B32B 5/02 |
| 9101397 | 2/1991 | United Kingdom | D04H 1/46 |

OTHER PUBLICATIONS

Fairchilds, Dictionary of Textiles. pp. 387 and 543, 1993.

*Primary Examiner*—Rich Weisbergen
*Attorney, Agent, or Firm*—David M. Ronyak

[57] ABSTRACT

Fibrous substrates for the production of carbon and/or ceramic (including mixtures of these) fiber reinforced carbon and/or ceramic (including mixtures of these) matrix composites, particularly friction discs, and to methods of manufacture of same. Offcut waste fibrous sheet material may be recycled and reformed into a web useful in the manufacture of such composites.

27 Claims, 4 Drawing Sheets

CARBON FIBER REINFORCED CARBON/CARBON COMPOSITE AND METHOD OF ITS MANUFACTURE

This is a continuation of our application for Carbon Fiber Reinforced Carbon/Carbon Composite And Method Of Its Manufacture, U.S. patent application Ser. No. 07/754,774 filed Sep. 4, 1991, abandoned.

This invention relates to fibrous substrates for the production of carbon and/or ceramic (including mixtures of these) fiber reinforced carbon and/or ceramic (including mixtures of these) matrix composites and to methods of manufacture of same. This invention particularly relates to the friction discs useful in aircraft braking systems and their manufacture.

BACKGROUND OF THE INVENTION

Exemplary of such a composite is a carbon fiber/carbon matrix brake disc made by depositing a carbon matrix on a carbon fiber substrate of the invention, the fibrous material of the substrate being carbonized to reinforce the carbon matrix with carbon fibers. Deposition of carbon on the substrate is effected by in situ cracking of a carbon bearing gas (hereinafter referred to as carbon vapor deposition, abbreviated "CVD" or carbon vapor infiltration, abbreviated "CVI", as these terms are used interchangeably for purposes of the present invention) or by repeatedly impregnating the substrate with a carbon bearing resin and thereafter charring such resin or a combination of such methods to densify the carbon matrix on the carbonized substrate. The invention is not directed to formation of the carbon matrix or densification of the carbon fiber substrate, but rather to the substrate, its preparation, and subsequent densification in known manner to provide a carbon fiber reinforced composite, especially one suitable for use as a friction disc in a brake or clutch.

Such friction disc preforms are commonly prepared from virgin polyacrylonitrile (PAN) fiber which, particularly if CVD is to be employed, is preferably in an oxidized condition which facilitates subsequent carbonization. Oxidized PAN fiber (which may hereinafter be referred to as "OPF") is available commercially in various forms, including tows, yarns, woven and non-woven fabrics, knit fabrics and felts. Layers of such materials may be mechanically united prior to CVD, for example, by needlepunching. Suitable 12 k PAN tows may be obtained from Zoltek of Bridgeton, Mo., and RKT of Muir of Ord, Scotland. As used herein the term "tow" is used to refer to a continuous strand of continuous filaments. As used herein the term "yarn" is used to refer to a continuous strand of continuous or staple fibers or blends of these; thus the term "yarn" encompasses tow.

Figure 7:
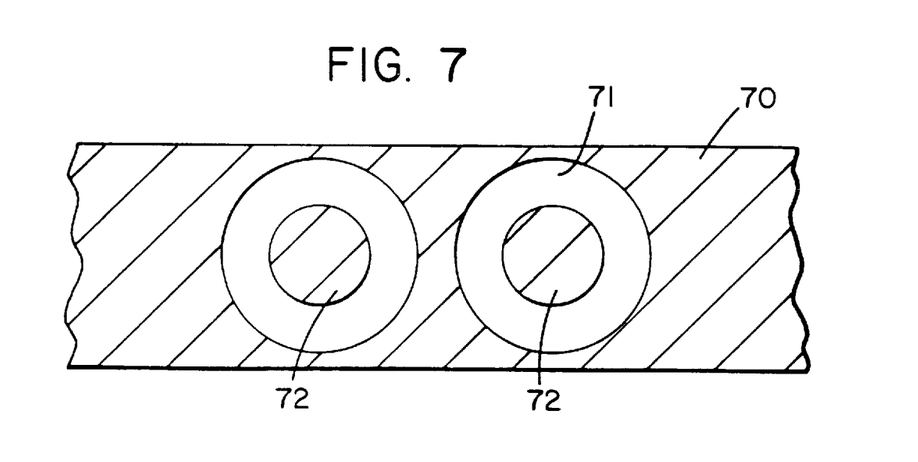
FIG. 7 is a plan view of a fibrous sheet after annuli have been stamped or cut out of it.

In certain known processes for the manufacture of carbon fiber reinforced friction discs, such as brake discs employed on aircraft, as an example only, annuli are cut out of a parallel-sided sheet of PAN fiber material of the requisite thickness or a plurality of annuli of lesser thickness are stacked and joined by needlepunching to form a substrate of the desired thickness. As shown in FIG. 7, this procedure results in considerable wastage of expensive continuous filament PAN sheet 70 because of the relatively large amount of offcut material that is generated when annuli are removed therefrom which cannot be reprocessed to continuous filament form to make a new continuous filament sheet. Additional expensive PAN sheet material is wasted during subsequent CVD densification of such an annulus in known manner. During such CVD densification the pores of the annulus nearest its surface experience the fastest rate of deposition and thus become of reduced size thereby limiting the rate of deposition, particularly within the central portion of the annulus. According to known CVD practice, following CVD to partial density in known manner, the partially densified discs are removed from the CVD furnace and subjected to a machining operation in which the outermost portion of the annulus is removed thereby removing the outermost material whose pores have been occluded due to deposition of carbon or other matrix therein. The partially densified machined annulus is then returned to a CVD furnace for further CVD densification. This process is repeated until the desired final density is obtained. At the end of each CVD densification furnace cycle a little more of the outermost portion of the annulus is removed by machining, thereby reopening the passageways for the CVD gasses into the central portion of the core. This known practice results in considerable wastage of expensive PAN sheet. The term "partial density" and related forms as used herein means not up to the minimum density specified to exist for a given product at the conclusion of all CVD densification cycles.

One approach to reduce wastage of expensive PAN sheet material in the production of preforms to be used in production of discs for aircraft braking systems is described in EP publication O 232 059 A2 to Smith. According to Smith, a shaped filamentary structure is prepared in the following manner: needlepunching a unidirectional layer of filaments to provide a degree of dimensional stability; cutting a plurality of segments from the layer of needlepunched material; assembling a plurality of such segments in side-by-side contiguous relationship to produce a filamentary layer of the required structural shape; superposing at least one similar layer on the first layer; and needlepunching the superposed layers to assemble and join the segments. The purpose of cutting segments from the dimensionally stable layer and assembling those segments side-by-side to produce a structural shape is to reduce wastage of the material because it is possible to lay out the segmental shapes to enable maximum use of filamentary sheet material. Nevertheless, offcut waste is generated and there remains a need to efficiently recycle such waste.

As described in GB 2 012 671B to Sherrin et al., offcut PAN sheet material from the cutting of annuli can be recycled by chopping it into staple fibers and thereafter forming a new fabric sheet by needlepunching a layer of carded (recycled) staple fibers to a substantially unidirectional array of continuous filaments extending transversely to the average direction of the carded staple fibers, from which reformed sheet material annuli are again cut out and the off-cut fabric sheet material may again be recycled in like manner. Annuli cut out of the sheet may be stacked to form a substrate for an all carbon brake disc. The stacked annuli may be needlepunched to hold them together.

Thus, there remains a need for reducing the amount of expensive virgin OPF needed to make a CVD friction disc both in forming the annular preform and its subsequent CVD densification. There remains a need for a method for recycling offcut fibrous waste without having to card it and combine it with longitudinal arrays of continuous filaments as is required according to GB 2 012 671B.

According to an aspect of the invention there is provided a fabric sheet having first and second faces, the fabric sheet comprising at least one layer of a web of non-woven fibers prepared by recycling fibers selected from the group consisting of PAN fibers including OPF, carbon fibers, graphite fibers, ceramic fibers, precursors of carbon fibers and precursor of ceramic fibers, and mixtures of these, the web having substantially uniform randomness in direction and a mean fiber length of between 10 and 25 millimeters (0.4 and 1.0 inches) when tested according to ASTM D 1440–77 (1982) (Array Method) using the double bank sorter, Suter-Webb Duplex Cotton Fiber Sorter.

According to another aspect of the invention there is provided a method of making a sheet of fibrous material comprising:

a) opening offcut fibrous material made from PAN fibers including OPF, carbon fibers, graphite fibers, ceramic fibers, precursors of carbon fibers and precursor of ceramic fibers, and mixtures of these, to form discrete staple fibers having a mean length of between about 10 and about 25 millimeters (0.4 and 1.0 inches) when tested according to ASTM D 1440; and b) airlaying said opened fibers into a web and pre-needlepunching the web to a thickness of from about 5 to about 11 millimeters and a fiber volume of from about 7 to 14 percent.

The resultant airlaid web of the invention may be joined to one or more layers of tow, woven, braided, or knit material or mixtures of these to form a unitary sheet by needlepunching. Multiple layers of such airlaid web may be stacked directly upon one another and joined by needlepunching to either face of a core preform that has been formed in known manner, e.g. such as in EP publication O 232 059 A2, or GB 2 012 671B or superposed layers of tow that have been needlepunched into a unitary sheet. These outermost layers may be progressively sacrificed by machining away during subsequent multiple furnace cycle CVD densification. Also, layers of such airlaid web may be used to form a new core preform by stacking such airlaid web, preferably in a repetitive pattern, most preferably in alternating manner, with additional layers of tow, woven, braided, knit material, and mixtures of these and forming them into a unitary sheet by needlepunching. Such preforms may be CVD densified in known manner thereby binding together the needlepunched layers with a matrix selected from carbon, ceramic, precursor of carbon, precursor of ceramic, and mixtures of these. The airlaid recycled fiber web of the invention may be prepared at lower cost than carding and thereafter joining the carded layer to a layer of continuous filaments by needlepunching as in GB 2 012 671B. Also, the properties of the airlaid web are preferred for both sacrificial layers and as part of the core because of their random fiber orientation which exists even prior to needlepunching. In contrast, in a carded layer, needlepunching is the only way to create Z-direction fibers. As used herein, the term "Z-direction" means inclined out of the plane defined by the web, and for a curved web inclined toward the radial direction of the web rather than the tangential or the circumferential direction of the web.

The resultant recycled fiber web of the invention may be employed in the manufacture of friction discs, gasketing, high temperature insulation, felting, carbonized paper and possibly other applications.

The above and other features and advantages of the invention will become more apparent when considered in light of the following description of preferred embodiments of the invention in conjunction with the accompanying drawings which also form a part of the specification. In the drawings like numbers are used to refer to like parts or features.

METHOD OF MAKING NON-WOVEN WEB USING RECYCLED FIBER OPENING

It is necessary to first open the dense offcut waste of the sheet material remaining after die cutting of the annular carbon fiber or precursor of carbon fiber preforms. This waste material may be in the form of the remnants including solid discs 72 of a continuous sheet 70 of fibrous material having annular holes 71 therethrough where the hollow annuli have been removed for use in the manufacture of friction discs. This sheet material may have been prepared using any of a variety of methods, including those referred to hereinbefore in the Background-of-the-Invention section of this specification, and by cross-lapping continuous filament tows of PAN fiber and thereafter needlepunching them to join the cross-lapped layers and compact them to a suitable density for further processing as friction disc preforms. The operation of a crosslapper is shown and described in GB 2 012 671B. The dense offcut OPF sheet material may have a thickness of up to two inches or more, and a bulk density up to about 0.8 grams per cubic centimeter (g/cc). The term "bulk density" as used herein is calculated by dividing the weight of the sample by its volume and is expressed in g/cc.

Due to the substantial thickness and density of such offcut waste material, in order to reclaim its fibers, it is first necessary to open this waste material. This may be accomplished utilizing a commercially available textile machine which is referred to by some as a "shredder", by others as an "opener" and by still others as a "picker" and will be hereinafter referred to as a "shredder/opener". Suitable equipment of this type is available from Laroche of Cours, France. Other types of equipment, such as those manufactured by Dell'orco & Villani of Capalle, Italy, or Schirp of Wuppertal, Germany, may also be employed.

As an example only, utilizing a Laroche model referred to as a Three Cylinder Olympic With Shredder, the dense OPF waste sheet material was fed into the shredder/opener utilizing the following machine settings: The variable speed control was set to its lowest value, each of the three cylinders was set to the highest available setpoint, number 6. Number 6 is a number which correlates to the spacing between the cylinder pins and the feedplate and therefore the size of the particles of the material to be shredded allowed to pass through. Smaller cylinder pins/feedplate setpoint values will produce shorter fiber and less clumps when all other factors are held constant.

The fibrous output of the shredder/opener may be referred to as "fluff". The term "fluff" as used herein means opened fiber that is fluffy in appearance and ideally contains no hard clumps of unopened fiber. The fibers of the fluff may be easily separated from one another manually, even from a sample of fluff that has been manually pulled from a bale of the fluff. Opened fibers containing lumps can be recycled according to the invention, but such lumps may cause needles to be broken during needlepunching operations. Raw fluff as it comes from the Shredder/Opener is preferably cleaned to remove clumps, short fibers and foreign matter. This may be accomplished in known manner, e.g. by passing it through a model RST 1200 cleaner available from Trützschler of Monchengladbach, Germany.

WEB FORMATION

The term "web" as used herein means a wide film of random oriented and mechanically interlocked fibers such as that formed by air deposition (airlaying) and used to make non-woven fabrics. The recycled fiber fluff obtained from the shredder/opener is processed as described below into a web which is added to a developing non-woven fabric sheet which later may be employed to prepare a carbon/carbon brake disc or other preform.

The best method to obtain the minimum density of a web desirable for such brake preform use, i.e., a web density of at least about 0.1 g/cc, is through airlaying followed by pre-needlepunching. Suitable web airlaying equipment may be obtained from Rando of Macedon, N.Y.; Dr. Ernst Fehrer of Linz, Austria; and DOA of Wels, Austria.

In operation, opened recycled fiber is fed into commercially available airlay equipment such as that available from Fehrer. The fibers thereof are separated into small groups of fibers which are dispersed in moving air and collected to form web. The web is pre-needlepunched shortly after being formed and prior to further processing according to the invention. The pre-needlepunched airlaid web of OPF may have a density ranging from about 0.1 to about 0.2 g/cc and preferably has a density from about 0.1 to about 0.15 g/cc. This corresponds to a fiber volume ranging from about 7 to about 14 percent and preferably from about 7 to about 10.5 percent. "Fiber Volume" is equal to the weight/unit volume of the web or sheet divided by the density of the fibrous material of which the web or sheet is made. OPF has a density of about 1.37 g/cc. The thickness of the pre-needlepunched web preferably ranges from about 4 to about 11 millimeters (mm), more preferably from about 6.9 to about 8.1 mm, and most desirably about 7.5 mm prior to further needlepunching. Thickness of the web is determined according to ASTM D 1777–64 (Reapproved 1975) (Standard Method for Measuring Textile Materials).

It is necessary to pre-needlepunch the airlaid web prior to removing it from the airlaying machine and stacking layers of such web for additional needlepunching to join them into a unitary structure of greater thickness than that of a single web layer. Pre-needlepunching provides consistency and facilitates handling of such pre-needlepunched web. In this specification and the accompanying claims, except where the immediate context explicitly indicates otherwise, it is to be understood that reference to an airlaid web of recycled OPF is meant to refer to a pre-needlepunched web.

When using such recycled OPF web in the manufacture of friction discs, it is believed desirable to obtain disc preforms of recycled OPF fiber having a fiber volume of from about 29 to about 58 percent which corresponds to a bulk density of from about 0.4 to about 0.8 g/cc.

Suitable needles for use in pre-needlepunching the airlaid web of PAN fiber may be obtained from Foster Needle of Manitowoc, Wis. These are identified as 15×18×36×3.5 SBA F 20 4-22-3B/C felting needles although other needles may be employed. When employing such needles to form airlaid recycled OPF web, it was ascertained that about 94 srokes per square centimeter produced desirable web, although it is believed that 75 to 125 strokes per square centimeter would also produce acceptable web.

Figure 3:
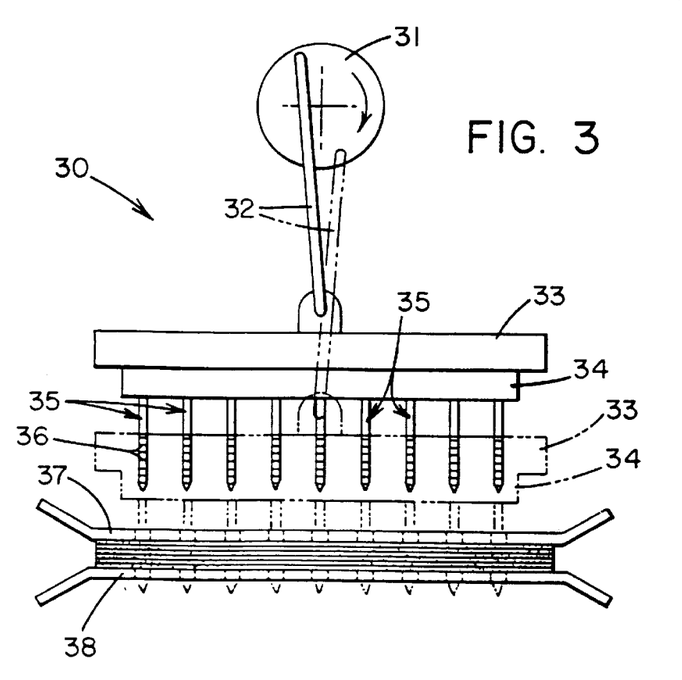
FIG. 3 is an elevational schematic view of a needle loom.
Figure 4:
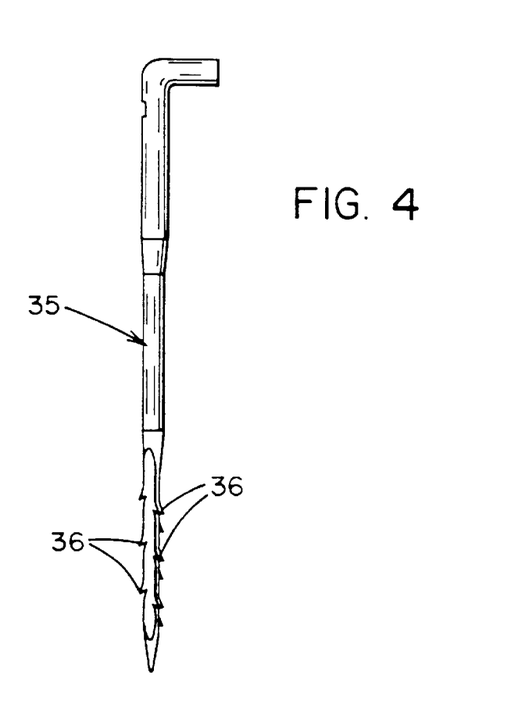
FIG. 4 is an enlarged schematic depiction of a representative needle used in the needle loom of FIG. 3.

Pre-needlepunching and needlepunching operations referred to herein may be accomplished by passing the layer or superposed layers through a conventional needlepunch loom such as needlepunch loom 30 illustrated schematically in FIG. 3, fitted with needles such as representative needlepunch needle 35 illustrated in FIG. 4. Loom 30 includes rotatable crank 31, connecting rod 32, reciprocable platen 33, needle board 34, needles 35, stripper plate 37, and bed plate 38. Rotation of crank 31 effects reciprocating motion of platen 33, causing needles 35 of needleboard 34 to reciprocally move through stripper plate 37 toward and away from bed plate 38. The fibrous layers to be joined are passed between stripper plate 37 and bed plate 38 while reciprocating motion of the needleboard 34 causes needles 35 to penetrate the fibrous layers. The barbs 36 of needles 35 effect cross-linking of the layers by displacing filaments out of the layers in a direction generally perpendicular to the faces of the layers.

Fiber obtained from offcut continuous filament OPF sheet may be recycled into a pre-needlepunched airlaid web that is made of one hundred percent (100%) recycled fiber without blending in any form of virgin fiber. It is unnecessary to utilize a sacrificial substrate as described in U.S. Pat. No. 4,780,363 to Evans et al. or to needlepunch the web to a unidirectional array of continuous filaments as in GB 2 012 671B. However, airlaid webs formed of blends of recycled and virgin OPF are believed to be easier to form than when 100% recycled fiber is employed because virgin fiber facilitates mechanical bonding of the fibers to one another due to its greater mean fiber length and the presence of crimp, if any. Longer fibers intersect a greater number of other fibers than do shorter fibers and thus facilitate web formation.

The fiber opening operation has been conducted with machine settings (Laroche equipment) which resulted in a broad range of fiber lengths with the mean fiber length being approximately 0.75 inch (19 mm) when tested according to ASTM D 1440–77. The fiber opening operation when conducted by of Paltex Incorporated of Los Angeles, Calif. using its proprietary machinery and settings resulted in a broad range of fiber lengths with the mean fiber length being approximately 1.0 inch (25 mm). No single mean fiber length has been determined to be most desired or critical for the manufacture of airlaid web from such recycled fibers for use in the manufacture of friction disc preforms. Experience to date is contrary to the commonly held view that a mean fiber length of between 40 millimeters and 100 millimeters is necessary for successful conversion of OPF by airlaying into a web. This 40 to 100 millimeters mean length is not attainable through practice of the shredding/opening operations described herein upon needlepunched OPF sheet prepared from layers of tows that have been needlepunched into a unitary structure. It is believed that airlaid web can be made of OPF having a mean fiber length of at least 0.4 inch (10 millimeters).

Figure 8:
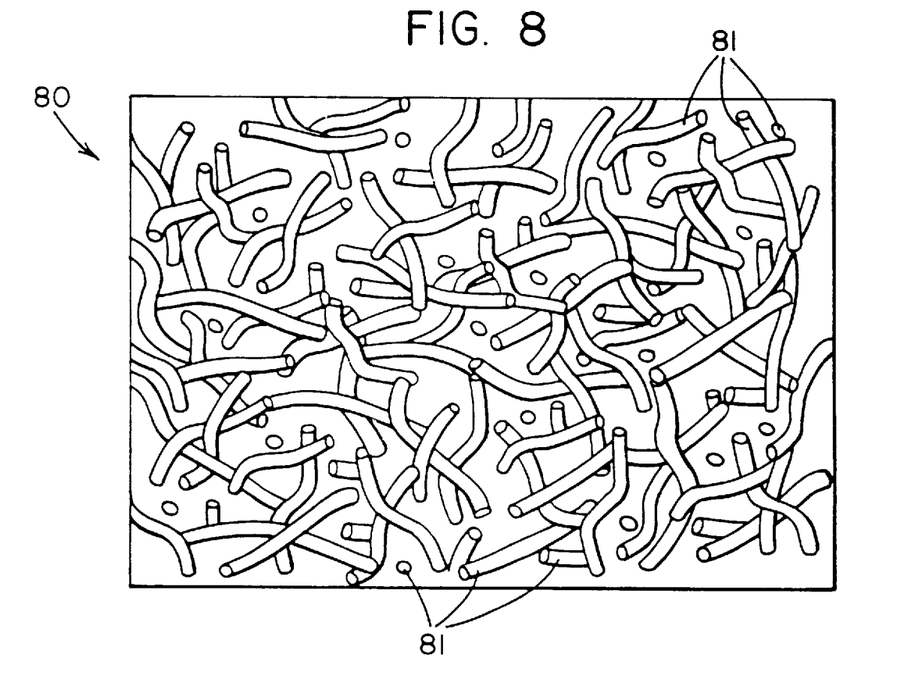
FIG. 8 is an enlarged plan view depicting the random fiber distribution in a web of recycled airlaid material.

FIG. 8 schematically shows an airlaid fiber web 80 according to the invention. The airlaid fiber web 80 of the invention has a higher percentage of its fibers 81 oriented toward the Z-direction than conventional needlepunched webs of carded fibers (not illustrated) or continuous crosslapped tows (not illustrated).

In contrast to other approaches known in the manufacture of friction discs, such as carded staple or crosslapped tows, the resulting pre-needlepunched airlaid web such as web 80 shown in FIG. 8 exhibits general randomness of its fibers within the plane of the web relative to the machine direction and at an angle from the plane of the web, i.e., inclined or tending toward the Z-direction. The Z-factor of such a web may be expressed mathematically as the sum of the Z-component contribution of each of the fibers forming the web. The Z-component contribution $Z_1$ of fiber $F_1$ is equal to the length $L_1$ of $F_1$ times the sine of the angle $\theta_1$ where $\theta_1$ is the angle of inclination of $F_1$ relative to the plane X-Y of the fibrous web or sheet. The Z-factor of web 80 may be expressed as $$Z = \Sigma L_1 \sin \theta_1 + L_2 \sin \theta_2 \ldots + L_n \sin \theta_n / L_1 + L_2 \ldots + L_n. \quad \text{(Eq. 1)}$$

In contrast a layer of carded staple or continuous tow has a Z-factor of nearly zero because all the fibers are aligned in the machine direction, i.e. lie parallel to the X-Y plane defined by the layer. Webs according to the invention have a significant Z-factor.

Another method for characterizing the randomness and Z-factor of the web is being developed at Texas Tech University and is based upon the porosity or tensile strength of the web. A round plate having a diameter of about three inches with a five degree sector removed therefrom was positioned on top of the piece of the web being tested and air permeability through the sample was measured with the open sector of the plate at 0°, 45°, 90°, 135° and 180° relative to the machine direction. Similar permeability values are indicative of a uniform random web. Substantially similar values (2.59 to 2.91 cfm/ft$^2$ with the average value being 2.79 cfm/ft$^2$) were obtained for a 800 g/m$^2$ airlaid web of OPF according to the invention.

BRAKE DISC PREFORM MANUFACTURE

A plurality of layers of pre-needlepunched airlaid web may be superposed and further needlepunched in a conventional manner to form and consolidate them into a unitary structure having a greater bulk density than that of the individual layers preceding such further needlepunching. For use as a friction disc preform, it is desired to have a recycled OPF preform density of from about 0.4 to about 0.8 g/cc although lower density may be acceptable in certain applications. It is believed that lower density/fiber volume is desired for airlaid web forming all or part of a sacrificial layer than for airlaid web forming a part of the core because such lower density of the sacrificial layer material promotes mass transfer of the gasses into and out of the core during its CVD densification.

Figure 1:
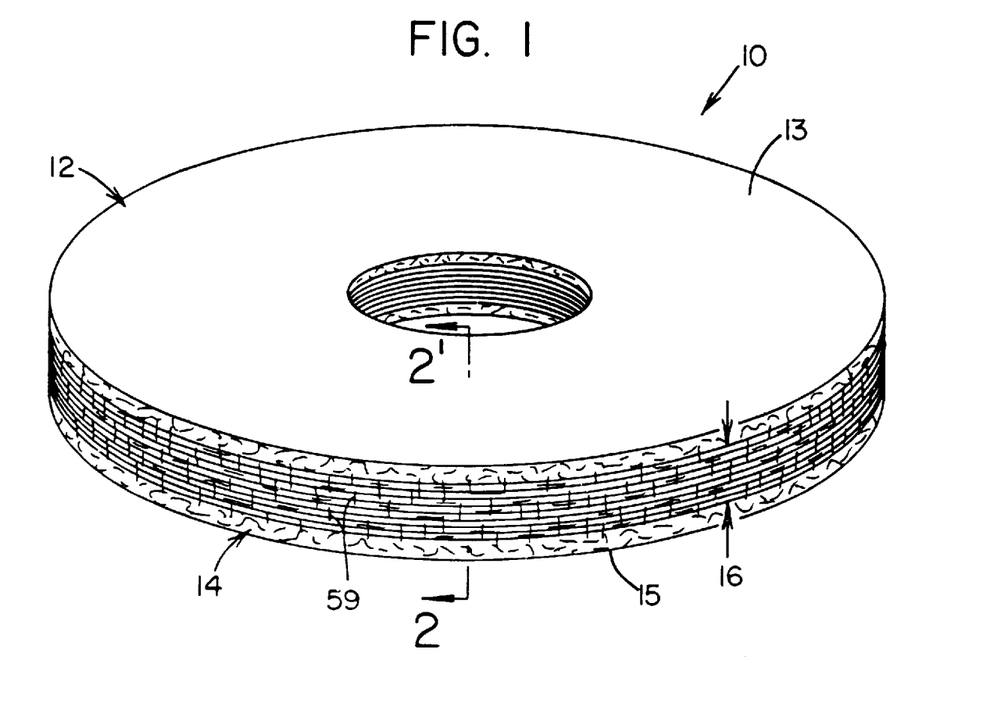
FIG. 1 is an isometric view of a friction disc preform according to the invention.
Figure 2:
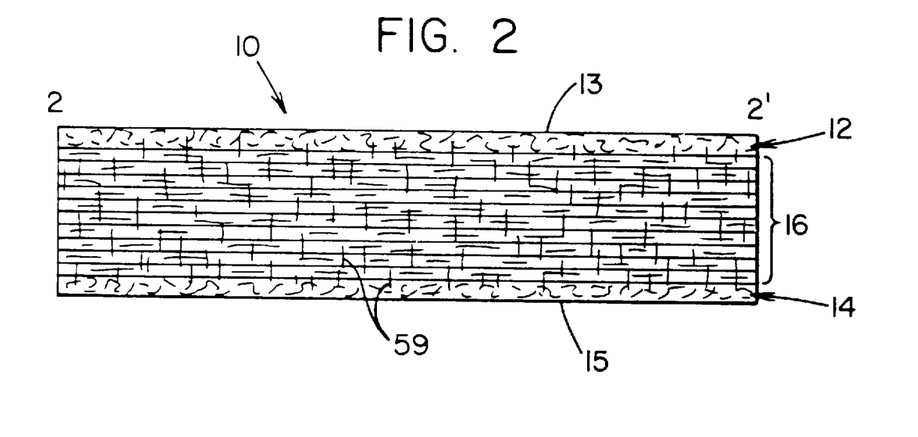
FIG. 2 is an enlarged sectional view taken along plane 2–2' of FIG. 1, depicting schematically the fiber distribution within the preform.

Needlepunched airlaid web of the invention may be utilized as a sacrificial facing material in combination with a core preform. The core preform may be formed of knit, braided, woven or other fibrous material including but not limited to virgin continuous filament preform material that has been prepared by other processes such as crosslapping followed by needlepunching or other techniques such as those described hereinbefore in the Background-of-the-Invention section of this specification. Such airlaid web sacrificial layers are preferably joined to the core preform material by needlepunching. As shown in FIGS. 1 and 2, needlepunching of the superposed fibrous layers of disc-shaped preform 10 produces cross-linking of the fibrous layers by filaments such as filaments 59 displaced out of the layers and extending in a direction generally perpendicular to the faces of the layers, i.e., the Z-direction. The airlaid web may be compressed by further needlepunching to a higher density prior to or at the time of joinder to the core preform.

During densification by CVD of the resulting disc-shaped preform 10 shown in FIG. 1, the exterior surfaces including surface 13 of the airlaid sacrificial layer 12, and surface 15 of airlaid sacrificial layer 14 densify more rapidly than the material of the core 16 resulting in reduced porosity at the surface. Following CVD to partial density in known manner, the partially densified discs are removed from the CVD furnace and subjected to a machining operation in which the outermost portion of the airlaid sacrificial layers 12, 14 is removed thereby removing the outermost material whose pores have been substantially reduced in size or occluded due to deposition of carbon therein. The partially densified machined discs are then returned to a CVD furnace for further CVD densification. This process is repeated until the desired final density is obtained. At the end of each CVD densification furnace cycle a little more of the outermost portion of the airlaid sacrificial layers is removed by machining, thereby reopening the passageways for the CVD gasses into the central core 16. After completion of the final CVD densification cycle, any remaining sacrificial airlaid material may be machined away leaving a fully densified disc of the core preform material.

In a preferred embodiment, the PAN fiber is understood to be in its oxidized state, i.e. to be OPF, when subjected to all textile processes described herein. While it may be possible to produce suitable preforms out of greige (unoxidized) PAN fiber and thereafter oxidize such preforms in a batch method as opposed to the continuous oxidation method employed in the manufacture of OPF, this is not deemed to be most economical, particularly, because prior to oxidation, the PAN fiber does not have the desired high density nor is it able to withstand the high temperature of the furnace cycles desired to be subsequently employed.

The airlaid web of recycled fiber comprises one machine direction layer. As used herein, the term "machine direction" means the direction in which the material being processed moves through the machine. One or more layers of such web may be superposed onto and needlepunched simultaneously into previously formed and arranged fibrous layers. Once a needlepunched fibrous sheet of desired thickness is reached, annuli are formed and removed in conventional manner, e.g., by a hydraulic press equipped with suitable punch cutting dies or by water jet cutting to create the preform discs for use in the manufacture of friction discs. The resulting preform discs, when formed of OPF, are converted into carbon/carbon composite material by either carbon vapor deposition (CVD) or resin char or a combination thereof in known manner. The offcut fibrous material may again be recycled through a shredder/opener and reformed into yet another airlaid web with or without blending in of virgin OPF staple fiber or other fibers including carbon fibers, graphite fibers, ceramic fibers, precursors of carbon fibers and precursors of ceramic fibers, and mixtures of these. The resulting airlaid web of recycled fiber may be combined by needlepunching with one or more layers of carded staple fibers, or unidirectional continuous filaments, or crosslapped layers of continuous filaments or any combination of these or other methods of manufacturing carbon/carbon fiber preforms for use in friction discs such as aircraft brake discs.

Figure 5:
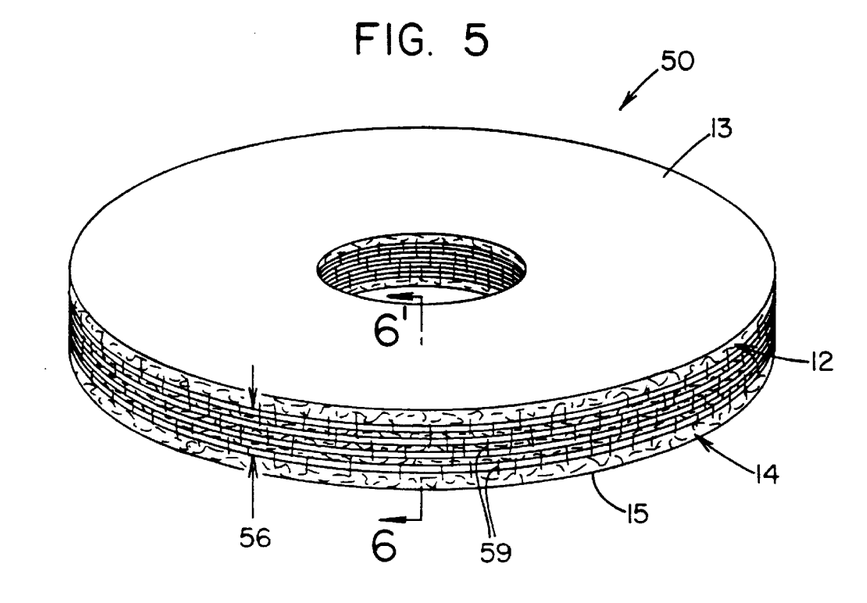
FIG. 5 is an isometric view of an alternate embodiment of a friction disc preform according to the invention.
Figure 6:
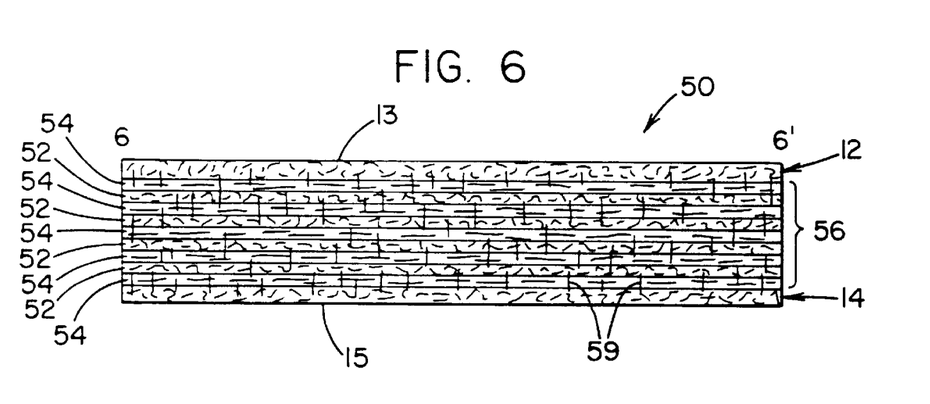
FIG. 6 is an enlarged sectional view taken along plane 6–6' of FIG. 5, depicting schematically the fiber distribution within the preform.

As shown in FIGS. 5 and 6, friction disc 50 comprises a core 56 formed of superposed layers 52 of airlaid web stacked in alternating manner with layers 54 formed from crosslapped layers of OPF tow and upper and lower sacrificial layers 12, 14 respectively formed of a plurality of layers of recycled fiber airlaid web. The airlaid web layers 52 of the core 56 and the crosslapped OPF tow layers 54 of the core 56 are joined together and consolidated by needlepunching. Core 56 and upper and lower sacrificial layers 12, 14 respectively may be formed separately prior to their joinder by needlepunching. Needlepunching of the superposed fibrous layers produces cross-linking of the fibrous layers by filaments such as filaments 59 displaced out of the layers and extending in a direction generally perpendicular to the faces of the layers, i.e., the Z-direction.

It is not known how many times offcut sheet material can be recycled as described herein and reformed into sheet material. It is, however, possible to blend multiple cycle offcut sheet material with first pass offcut sheet material and/or virgin fiber to facilitate airlaid web formation and thus substantially completely utilize and repeatedly recycle such offcut waste fiber except for minor losses induced by the shredder/opener operation. Each recycling pass through the shredder/opener results in loss of between about 3 and about 7 weight percent of the amount of feedstock due to breakdown of the fibers and the removal of such broken down fibrous material as "dust". The shredder/opener can be adjusted to remove a greater quantity of material as "dust" by adjusting it to remove all material including all fibers up to a specified length which may be equal to or greater than one sixteenth of an inch. One sixteenth of an inch is the smallest mean fiber length category expressed on the ASTM D 1440–77. Removal of all broken down fibrous material and fibers including fibers of length greater than one sixteenth inch may facilitate airlaid web formation without addition of virgin fiber but it will reduce overall efficiency if measured in terms of the percentage of fibrous feedstock that is converted to reformed sheet. Preferred cleaning of the raw fluff results in further loss of feedstock, typically between about 10 and 20 weight percent of feedstock, due to removal of short fibers and foreign matter. It is also possible to produce airlaid webs as described herein by use of virgin staple fiber which may be prepared from tow.

The term "carbonizable" as used herein means formed of carbon or having the capability of being converted to carbon. PAN fiber, OPF, cotton, rayon and other cellulosic fibers are examples of materials that are carbonizable.

In the following examples embodiments of carbon/carbon friction discs according to the invention and their preparation according to the invention are described. The invention, however, is not to be construed as being limited to the particular embodiments set forth in the following examples.

EXAMPLE 1

A friction disc preform was prepared as follows. A layer of 9 ounces/square yard plain weave cotton fabric was placed on the bed of a needlepunch loom. A sacrificial lower facing was formed by superposing two layers of 800 g/m$^2$ pre-needlepunched airlaid OPF web on the cotton fabric and joining them by needlepunching them together with a layer of crosslapped tow. Thereafter, a core was formed and joined to the lower sacrificial facing by superposing in alternating manner eleven layers of crosslapped tows of OPF with eleven layers of 400 g/m$^2$ pre-needlepunched airlaid OPF web on to the developing sheet with needlepunching after the addition of each layer. To complete the developing preform an upper sacrificial facing was formed by superposing two layers of 800 g/m$^2$ pre-needlepunched airlaid OPF web on the core joining them to one another and the core by needlepunching. The preform sheet material being manufactured was subjected to needlepunching using needles at a rate of about 100 to 110 strokes per square centimeter per pass through the needle loom. The needles employed throughout this Example 1 were 15×18×36×3.5 C333 G 1002 from Groz-Beckert of Germany. Annular friction disc preforms were cut from the resulting fibrous sheet, CVD densified in known manner and thereafter machined and assembled into a multi-disc brake. The sacrificial layers were progressively machined away during the required multiple CVD densification furnace runs. Any sacrificial facing material remaining after reaching the desired final density was machined away prior to assembly into the brake. Testing of the brake indicated that discs of this Example 1 can be expected to provide satisfactory performance in certain braking applications.

EXAMPLE 2

A plurality of friction disc preforms were prepared as in Example 1 with the following exceptions. First, a portion of the core of the fibrous sheet material was formed by needlepunching superposed layers of crosslapped OPF tows. The first sacrificial facing was formed by superposing three layers of 800 g/m$^2$ pre-needlepunched airlaid OPF web to the upper face of the core portion and joining them by needlepunching. After joinder of the first sacrificial facing to the core portion, the assembly was flipped over to expose the other face of the core portion of the sheet material which was then completed by adding further superposed layers of crosslapped OPF tows with needlepunching. To complete the developing preform sheet material an upper sacrificial facing was formed by superposing three layers of 800 g/m$^2$ pre-needlepunched airlaid OPF web on the completed core portion and joining them to one another and the core portion by needlepunching. Annular friction disc preforms were cut from the resulting fibrous sheet, CVD densified in known manner and thereafter machined and assembled into a multi-disc brake. Testing of the brake indicated that discs of this Example 2 provided performance corresponding to a brake whose discs were formed from a preform made entirely of tow layers, the outermost ones of which were machined away during CVD densification.

It is also believed possible, although not preferred, to practice the invention using carbon fiber. Carbon fiber has a higher density of from about 1.74 to 1.78 g/cc compared to OPF which has a density of about 1.37 g/cc. Recycled sheet material and preforms made of such carbon fiber may have a higher density compared to those formed of OPF at the time of entering the subsequent CVD furnace cycles and thus may be expected to require less initial time in such subsequent furnace cycles, but could be more difficult to densify to a desired final density in the range of about 1.79 g/cc to about 1.85 g/cc. Due to the conductive nature of such carbon fiber, electrical components of such machinery must be sealed in a manner to prevent conductive particulate matter from the tows or fibers from shorting out such electrical equipment. Machinery of this type including braiders and needlepunching looms is commercially available.

What is claimed is:

1. A fabric sheet having first and second faces, the fabric sheet comprising at least one layer of a web of non-woven fibers consisting essentially of fibers selected from the group consisting of PAN fibers, carbon fibers, graphite fibers, ceramic fibers, precursors of carbon fibers, and mixtures of these, the web having substantially uniform randomness in direction with respect to said first face of the web and being formed of discrete staple fibers having a mean fiber length of between 10 and 25 millimeters (0.4 and 1.0 inches) when tested according to ASTM D 1440.

2. The fabric sheet of claim 1 where the web is formed essentially of OPF and is needlepunched.

3. The fabric sheet of claim 1 wherein the web is needlepunched and has a fiber volume following needlepunching of from about 29 to about 58 percent.

4. The fabric sheet of claim 2 wherein the web has a density following needlepunching of from about 0.4 to about 0.8 grams per cc.

5. The fabric sheet of claim 1, further comprising at least one additional layer of other fibrous material selected from the group consisting of needlepunched web, an unidirectional array of filaments, a multi-directional array of filaments, woven, braided or knit fabric, the web layer and the said at least one additional layer of other fibrous material being joined to form a unitary sheet by needlepunching.

6. The fabric sheet of claim 1, further comprising a layer of crosslapped tow, the web layer and the tow layer being joined to form a unitary sheet by needlepunching.

7. The fabric sheet of claim 5, further comprising additional web layers stacked in a repetitive pattern with additional layers of other fibrous material and joined by needlepunching.

8. The fabric sheet of claim 6, further comprising additional web layers stacked in alternating manner with additional layers of crosslapped tow and joined by needlepunching.

9. The fabric sheet of claim 5, further comprising additional web layers joined to either face of the fabric sheet by needlepunching.

10. The fabric sheet of claim 6, further comprising additional web layers joined to either face of the fabric sheet by needlepunching.

11. The fabric sheet of claim 1 having a plurality of web layers joined by needlepunching to either face of the fabric sheet, said plurality of web layers having a combined thickness of from about 0.3 millimeters to about 5 millimeters (about 0.01 to about 0.2 inch), and a fiber volume of from about 29 to about 50 percent.

12. The fabric sheet of claim 5 having a plurality of OPF web layers joined by needlepunching to either face of the fabric sheet, said plurality of web layers having a combined thickness of from about 0.3 to about 5 millimeters (about 0.01 to about 0.2 inch), and a bulk density of from about 0.45 to about 0.65 g/cc.

13. The fabric sheet of claim 10, having a bulk density of from about 0.45 to about 0.75 g/cc.

14. The sheet of claim 8 having a flat annular shape.

15. The sheet of claim 14 further including a matrix binding together the needlepunched layers, the matrix being selected from the group consisting of carbon, ceramic, precursor of carbon, precursor of ceramic, and mixtures of these.

16. The fabric sheet of claim 1 wherein the web comprises discrete staple fabers that are prepared by recycling needlepunched arrays including continuous filaments selected from the group consisting of PAN fibers and precursors of carbon fibers and not including carbon fibers.

17. The fabric sheet of claim 1 wherein the web is needlepunched and has the fiber volume following needlepunching of from about 7 to about 14 percent.

18. The fabric sheet of claim 1 wherein the web is needlepunched and has a density following needlepunching of from about 0.1 to about 0.2 g/cc.

19. The fabric sheet of claim 1 wherein the web is needlepunched and has a thickness following needlepunching of from about 4 to about 11 millimeters.

20. The fabric sheet of claim 2 wherein the needlepunched web has a density from about 0.1 to about 0.2 g/cc and a thickness of from about 4 to about 11 millimeters.

21. A fabric sheet having first and second faces, the fabric sheet comprising at least one layer of a web of nonwoven PAN fiber staple, the web having substantial uniform randomness in direction, the staple fibers having a mean length of between about 10 and about 25 millimeters (0.4 and 1.0 inches) when tested according to ASTM D 1440.

22. The fabric sheet of claim 21 having a plurality of web layers joined by needlepunching to either face of the fabric sheet, said plurality of web layers having a combined thickness of from about 0.3 millimeters to about 5 millimeters (about 0.01 to about 0.2 inch), and a fiber volume of from about 29 to about 50 percent.

23. The sheet of claim 22, in its state after CVD densification, further including a matrix binding together the needlepunched layers, the matrix being selected from a group consisting of carbon, ceramic, precursor of carbon, precursor of ceramic and mixtures of these.

24. The fabric sheet of claim 5 wherein the web comprises discrete staple fibers that are prepared by recycling needlepunched arrays including continuous filaments selected from the group consisting of PAN fibers and precursors of carbon fibers and not including carbon fibers.

25. The fabric sheet of claim 21 wherein the web comprises discrete staple fibers that are prepared by recycling needlepunched arrays including continuous filaments of PAN fibers.

26. The fabric sheet of claim 1 wherein the web is prepared by opening fibrous material having a fiber volume of from about 29 to about 58 percent having a plurality of layers of fibrous material made from fibers selected from the group consisting essentially of PAN fibers, carbon fibers, graphite fibers, ceramic fibers, precursors of carbon fibers, and mixtures of these that are mechanically united by needlepunching, to provide discrete staple fibers having a mean fiber length of between 10 and 25 millimeters (0.4 and 1.0 inches) when tested according to ASTM D 1440.

27. The fabric sheet of claim 1 wherein the web is prepared by opening fibrous material having a density of 0.4 to 0.8 g/cc made from a plurality of layers of PAN fibers that are mechanically united by needlepunching, and processing said opened fibrous material to provide discrete staple fibers having a mean fiber length of between 10 and 25 millimeters (0.4 and 1.0 inches) when tested according to ASTM D 1440.

* * * * *